United States Patent
Chen et al.

(10) Patent No.: US 9,160,383 B2
(45) Date of Patent: Oct. 13, 2015

(54) METHOD FOR ESTIMATING COVARIANCE MATRICES AND USE THEREOF

(71) Applicant: Huawei Technologies Co., Ltd., Shenzhen, Guangdong (CN)

(72) Inventors: Jianjun Chen, Lund (SE); Fredrik Rusek, Lund (SE); Sha Hu, Lund (SE); Gengshi Wu, Lund (SE); Basuki Endah Priyanto, Lund (SE); Shashi Kant, Lund (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/077,968

(22) Filed: Nov. 12, 2013

(65) Prior Publication Data
US 2015/0131758 A1 May 14, 2015

(51) Int. Cl.
*H04L 27/06* (2006.01)
*H04L 27/01* (2006.01)
(Continued)

(52) U.S. Cl.
CPC ................. *H04B 1/1027* (2013.01); *H04B 1/16* (2013.01); *H04B 7/0456* (2013.01)

(58) Field of Classification Search
USPC ......... 375/229–236, 265, 295, 316, 299, 340, 375/346, 341, 343, 338, 219, 221, 220, 222, 375/306, 307, 310, 339, 342, 347, 348, 349, 375/350
See application file for complete search history.

(56) References Cited

U.S. PATENT DOCUMENTS

2004/0240587 A1   12/2004   Ozen
2006/0292990 A1*  12/2006   Karabinis et al. ............ 455/63.4
2007/0015545 A1*  1/2007   Leifer et al. ................ 455/562.1

FOREIGN PATENT DOCUMENTS

WO        2013050985        4/2013

OTHER PUBLICATIONS

Park et a, Complexity Reduced Iterative MAP receiver for INterference Suppression in OFDM based spatial multiplexing systems, Sep. 2004, IEEE Transactions on Vehicular Technology, vol. 53, No. 5, pp. 1316-1326.*

(Continued)

*Primary Examiner* — Linda Wong
(74) *Attorney, Agent, or Firm* — Leydig, Voit & Mayer, Ltd.

(57) ABSTRACT

The present disclosure relates to an iterative method for estimating covariance matrices of communication signals comprising a) computing a reference symbol covariance matrix estimate $\widetilde{R}_{RS}(k,l)$; b) inputting said reference symbol covariance matrix estimate $\widetilde{R}_{RS}(k,l)$ to a detector or a decoder in a first iteration, and thereafter inputting the covariance matrix estimate output from e) to the detector or the decoder in subsequent iterations to obtain an updated demodulated or decoded communication signal for each iteration; c) inputting the demodulated or decoded communication signal to a symbol generator; d) computing an updated data covariance matrix estimate $\widetilde{R}_{data}(k,l)$ for each iteration based on data symbols of said regenerated communication signal; e) combining said reference symbol covariance matrix estimate $\widetilde{R}_{RS}(k,l)$ and said updated data covariance matrix estimate $\widetilde{R}_{data}(k,l)$; and f) forwarding said covariance matrix estimate output to the detector or decoder in b) to obtain the updated demodulated or decoded communication signal for each iteration.

19 Claims, 7 Drawing Sheets

(51) Int. Cl.
  *H03D 1/04* (2006.01)
  *H04B 1/10* (2006.01)
  *H04B 7/04* (2006.01)
  *H04B 1/16* (2006.01)

(56) References Cited

OTHER PUBLICATIONS

"3GPP TR 36.829—3$^{rd}$ Generation Partnership Project; Technical Specification Group Radio Access Network; Enhanced performance requirement for LTE User Equipment (UE) (Release 11)," Version 11.0.0, 3$^{rd}$ Generation Partnership Project, Valbonne, France (Mar. 2012).

Li et al., "Adaptive Antenna Arrays for OFDM Systems With Cochannel Interference," IEEE Transactions on Communications, vol. 47, No. 2, pp. 217-229, IEEE, New York, New York (Feb. 1999).

Jang et al., "An Enhanced Interference Mitigation Scheme in the Presence of Asynchronous Inter-Cell Interference for MIMO-OFDMA," 2010 Digest of Technical Papers, International Conference on Consumer Electronics (ICCE), Las Vegas, Nevada, IEEE (Jan. 9-13, 2010).

Park et al., "Complexity-Reduced Iterative MAP Receiver for Interference Suppression in OFDM-Based Spatial Multiplexing Systems," IEEE Transactions on Vehicular Technology, vol. 53, No. 5, pp. 1316-1326, IEEE, New York, New York (Sep. 2004).

Kay, Steven M., "Fundamentals of Statistical Signal Processing—vol. II: Detection Theory," Prentice Hall (Feb. 6, 1998).

Jang et al., "Iterative Receiver with Enhanced Spatial Covariance Matrix Estimation in Asynchronous Interference Environment for 3GPP LTE MIMO-OFDMA System," IEICE Trans. Commun., vol. E92-B, No. 6, pp. 2142-2152, IEICE (Jun. 2009).

Nisar et al., "Iterative Suppression of Co-Channel Interference," 17$^{th}$ European Signal Processing Conference (EUPISCO 2009), Glasgow, Scotland (Aug. 24-28, 2009).

"Link Level Performance Evaluation of MMSE-IRC Receiver," 3GPP TSG-RAN WG4 Meeting #62, Dresden, Germany, Document R4-120527, Agenda item 8.3, 3$^{rd}$ Generation Partnership Project, Valbonne, France (Feb. 6-10, 2012).

"Simulation Assumptions for Enhanced Receiver," 3GPP TSG-RAN WG4 Meeting #63, Prague, Czech Republic, Document R4-123639, Agenda item 6.25.1, 3$^{rd}$ Generation Partnership Project, Valbonne, France (May 21-25, 2012).

"TP for Enhanced performance requirements for LTE UE SI," TSG—RAN Working Group 4 Meeting #62, Dresden, Germany, Document R4-120508, Agenda item 8.3, 3$^{rd}$ Generation Partnership Project, Valbonne, France (Feb. 6-10, 2012).

"Summary of link level performance evaluation (FDD)," TSG RAN WG4 Meeting #64, Qingdao, China, Document R4-124301, 3$^{rd}$ Generation Partnership Project, Valbonne, France (Aug. 13-17, 2012).

* cited by examiner

METHOD FOR ESTIMATING COVARIANCE MATRICES AND USE THEREOF

TECHNICAL FIELD

The present method relates to iterative methods for estimating covariance matrices of communication signals in a wireless communication system. Furthermore, the invention also relates to methods for using such covariance matrices, corresponding devices thereof, a computer program, and a computer program product.

BACKGROUND

Figure 1:
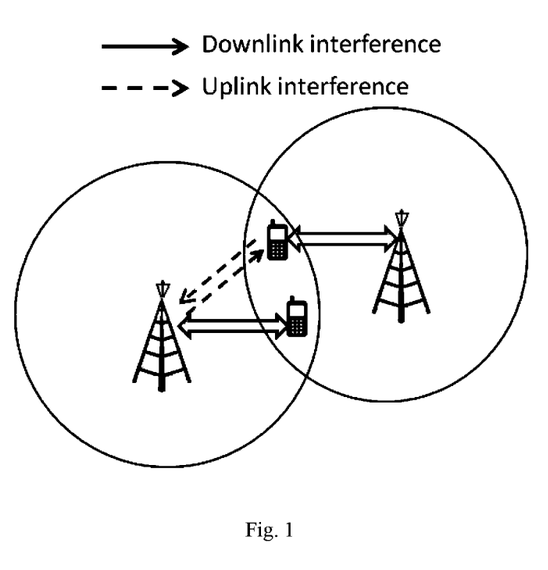
FIG. 1 illustrates the interference in the uplink and downlink of a cellular communication system.

In a multi-cell scenario, a network user (e.g. a UE in the 3GPP LTE system) will not only receive signal from a serving cell, but will also receive interfering signals from the other cells of the communication system. 3GPP proposes a frequency reuse factor of 1 in LTE systems which means that interference will generally be high. In the downlink, a UE will suffer from interference signals from neighboring e-NodeB(s). In the uplink, an e-NodeB will suffer from interference signals from other UEs in neighboring cells which are assigned to the same frequency radio resources. FIG. 1 illustrates the downlink interference and uplink interference in such a communication system.

The downlink/uplink interference, as illustrated in FIG. 1, will degrade the receiver performance. To achieve optimal receiver performance joint detection of the designated signal and the interference signals can be performed. However, such joint detection is usually not feasible since necessary information for decoding the interference signals with joint decoding usually is unavailable, such as rank indicator (RI), precoding matrix indicator (PMI), modulation and coding scheme (MCS), radio resource allocation, etc. The lack of necessary information also makes detection and cancellation of the interference signals very difficult.

By measuring/estimating the statistics of the interferences the impact of the interference can significantly be mitigated. For example, it is well known that Minimum Mean Square Error (MMSE) receivers utilizing the estimated covariance matrix of the interference plus noise can significantly improve the throughput (TPUT) performance. Such MMSE receivers are e.g. called MMSE IRC (Interference Rejection Combining) receivers. The covariance matrix can also be used in other types of receivers. For example, in maximum likelihood (ML) or quasi-ML receivers, this covariance matrix is used for pre-whitening the interference plus noise.

In general, the better the statistics of the interferences can be measured/estimated, the better receiver performance can be achieved.

Several non-iterative methods for estimating the covariance matrix of interference plus noise are known in the art. However, the performance of such non-iterative methods is not satisfactory.

Another approach is to use iterative methods for estimating the covariance of the interference. For example, based on the log likelihood ratios (LLRs) output from either a turbo decoder or a multiple-input and multiple-output (MIMO) detector, the transmitted signals from the serving cell can be regenerated, which are usually called soft-symbols. These symbols can be subtracted from the received signals for estimating the covariance matrix of the interference plus noise as, $$\widetilde{R_{data}}(k,l) = (y(k,l) - \widetilde{H}_0(k,l)\bar{s}_0(k,l))(y(k,l) - \widetilde{H}_0(k,l)\bar{s}_0(k,l))^H,$$

where $\bar{s}_0(k,l)$ is the regenerated soft symbols, and $\widetilde{R_{data}}(k,l)$ is the covariance matrix estimate based on the data for a single data resource element (RE). However, since the $\widetilde{R_{data}}(k,l)$ is very noisy most methods will average the above covariance matrix samples to get better estimation quality.

SUMMARY

An objective of the present disclosure is to provide a solution which mitigates or solves the drawbacks and problems of prior art solutions.

According to a first aspect of the invention, the above mentioned and other objectives are achieved by an iterative method for estimating covariance matrices of communication signals in a wireless communication system, wherein communication signals in the wireless communication system include reference symbols and data symbols; the method comprising the step of: receiving at least one communication signal transmitted over a radio channel, the received communication signal comprising at least one designated communication signal intended for a receiver node and one or more interfering communication signals; the method further comprising the steps of:

a) computing a reference symbol covariance matrix estimate $\widetilde{R_{RS}}(k,l)$ based on reference symbols of the received communication signal;

b) inputting said reference symbol covariance matrix estimate $\widetilde{R_{RS}}(k,l)$ to a detector or a decoder so as to obtain a demodulated or decoded communication signal in a first iteration step, and thereafter inputting the covariance matrix estimate output from e) to the detector or the decoder in subsequent iterations to obtain an updated demodulated or decoded communication signal for each iteration;

c) inputting the demodulated or decoded communication signal to a symbol generator so as to obtain a regenerated communication signal;

d) computing an updated data covariance matrix estimate $\widetilde{R_{data}}(k,l)$ for each iteration based on data symbols of said regenerated communication signal;

e) combining said reference symbol covariance matrix estimate $\widetilde{R_{RS}}(k,l)$ and said updated data covariance matrix estimate $\widetilde{R_{data}}(k,l)$ so as to obtain a covariance matrix estimate output based on said combined covariance matrix estimate; and f) forwarding said covariance matrix estimate output to the detector or decoder in b) so as to obtain the updated demodulated or decoded communication signal for each iteration.

According to an embodiment, the method further comprises the step of: filtering said reference symbol covariance matrix estimate $\widetilde{R_{RS}}(k,l)$ and said updated data covariance matrix estimate $\widetilde{R_{data}}(k,l)$ over a filtering window, the filtering window defining a set of resource blocks, RBs, or REs, wherein a RB includes a plurality of REs.

According to another embodiment, the filtering step involves: averaging said reference symbol covariance matrix estimate $\widetilde{R_{RS}}(k,l)$ and said updated data covariance matrix estimate $\widetilde{R_{data}}(k,l)$ over the filtering window. According to this embodiment the filtering step further involves: averaging said reference symbol covariance matrix estimate $\widetilde{R_{RS}}(k,l)$ and said updated data covariance matrix estimate $\widetilde{R_{data}}(k,l)$ over each RB so that said reference symbol covariance matrix estimate $\widetilde{R_{RS}}(k,l)$ and said updated data covariance matrix estimate $\widetilde{R_{data}}(k,l)$ are constant within each RB; and averaging said reference symbol covariance matrix estimate $\widetilde{R_{RS}}(k,l)$ and said updated data covariance matrix estimate $\widetilde{R_{data}}(k,l)$ over the filtering window using filter weights. According to this embodiment the filtering step may instead involve: estimating correlation coefficients between covariance matrix elements for each RE of the filtering window, and filtering said reference symbol covariance matrix estimate $\widetilde{R_{RS}}(k,l)$ and said updated data covariance matrix estimate $\widetilde{R_{data}}(k,l)$ based on the MMSE criterion using the estimated correlation coefficients over the filtering window.

According to an embodiment, precoding is employed on transmission data in the wireless communication system, and wherein the method further comprises the steps of: filtering different RB sets $n_i$, wherein each RB set defines the filtering window around and including a p-th RB so as to obtain a set of filtered covariance matrix estimates $\hat{R}^{n_i}(k,l)$ each corresponding to the RB sets $n_i$; computing likelihood functions for each covariance matrix estimates $\hat{R}^{n_i}(k,l)$; and selecting the covariance matrix estimates $\hat{R}^{n_i}(k,l)$ for the p-th RB, based on the likelihood functions, which is most probable as the covariance matrix estimate output for the p-th RB. According to this embodiment selecting said covariance matrix estimate output is based on the maximum posteriori, MAP, or the maximum likelihood, ML decision rule applied on the likelihood functions.

According to an embodiment, the step of inputting the demodulated or decoded communication signal involves: regenerating the intended communication signal $s_0(k,l)$ of the received communication signal; and the step of computing said updated data covariance matrix estimate $\widetilde{R_{data}}(k,l)$ involves: estimating said updated data covariance matrix $\widetilde{R_{data}}(k,l)$ based on the regenerated communication signal $s_0(k,l)$.

According to an embodiment, said reference symbol covariance matrix estimate $\widetilde{R_{RS}}(k,l)$ and said updated data covariance matrix estimate $\widetilde{R_{data}}(k,l)$ are linearly combined in the form: $a\widetilde{R_{RS}}(k,l)+b\widetilde{R_{data}}(k,l)$, where a and b are scalars.

According to an embodiment, the demodulated communication signal from the detector or the decoded communication symbol from the decoder is represented as Log Likelihood Ratios, LLRs.

According to an embodiment, the decoder is an error correction code decoder.

According to an embodiment, the detector is a MIMO detector.

According to an embodiment, the reference symbols are pilot symbols, such as common reference symbols, CRS, or demodulation reference symbols, DM-RS.

According to an embodiment, the wireless communication system is an Orthogonal Frequency-Division Multiplexing (OFDM) communication system, such as 3GPP LTE and WiFi.

The present disclosure also relates to a computer program, having code means, which when run by processing means causes said processing means to execute said method according to the invention; and a computer program product comprising a computer readable medium and the computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

The present disclosure further relates to a method in a detector or a decoder of a receiver node, the method comprising the step of: using at least one covariance matrix estimation output estimated according to the present disclosure for demodulation and/or decoding of the received communication signal.

According to a second aspect of the invention, the above mentioned and other objectives are achieved with a device arranged for iteratively estimating covariance matrices of communication signals in a wireless communication system, wherein communication signals in the wireless communication system include reference symbols and data symbols; the device comprises a processor arranged to: receive at least one communication signal transmitted over a radio channel, the received communication signal comprising at least one designated communication signal intended for a receiver node and one or more interfering communication signals; the processor further being arranged to:

a) compute a reference symbol covariance matrix estimate $\widetilde{R_{RS}}(k,l)$ based on reference symbols of the received communication signal;

b) input said reference symbol covariance matrix estimate $\widetilde{R_{RS}}(k,l)$ to a detector or a decoder so as to obtain a demodulated or decoded communication signal in a first iteration step, and thereafter input the covariance matrix estimate output from e) to the detector or the decoder in subsequent iterations to obtain an updated demodulated or decoded communication signal for each iteration;

c) input the demodulated or decoded communication signal to a symbol generator so as to obtain a regenerated communication signal;

d) compute an updated data covariance matrix estimate $\widetilde{R_{data}}(k,l)$ for each iteration based on data symbols of said regenerated communication signal;

e) combine said reference symbol covariance matrix estimate $\widetilde{R_{RS}}(k,l)$ and said updated data covariance matrix estimate $\widetilde{R_{data}}(k,l)$ so as to obtain a covariance matrix estimate output based on said combined covariance matrix estimate; and f) forward said covariance matrix estimate output to the detector or decoder in b) so as to obtain the updated demodulated or decoded communication signal for each iteration.

The present disclosure also relates to a receiver communication device arranged for communication in a wireless communication system, the receiver device comprising at least one device according to the invention and further being arranged to use at least one covariance matrix estimation output estimated by the device according to the invention.

The present disclosure provides an iterative method for obtaining improved covariance matrix estimation of the radio channel. This also implies that the receiver performance can be improved by the use of covariance matrix estimations according to the present disclosure.

The present disclosure further provides high design flexibility as the present method can use a detector or a decoder which means that performance contra complexity/delay can be chosen depending on the receiver requirements.

Further applications and advantages of the invention will be apparent from the following detailed description.

BRIEF DESCRIPTION OF THE DRAWINGS

The appended drawings are intended to clarify and explain different embodiments of the present disclosure in which.

DETAILED DESCRIPTION OF THE INVENTION

As mentioned above, iterative approaches have been presented in the art in order to improve the estimation quality of the covariance matrix of interference plus noise in received communication signals. However, these prior art methods are not suited to be used in practical radio communication networks for a number of reasons. For example, none of the prior art methods/devices pay attention to the effect of pre-coding matrix abrupt change at the boundaries of the PRBs in LTE downlink or any other corresponding pre-coding schemes. Prior art apply filtering/smoothing of the covariance matrix cross the boundaries of PRBs or even over the whole downlink bandwidth. However, in LTE downlink the data of different PRBs can have different pre-coding matrices, which very likely results in different covariance matrix, and thus prior art methods will not perform well in LTE downlink Moreover, the prior art methods to improve the covariance matrix estimates either need to use the output of a turbo decoder to generate soft symbols, or use a maximum likelihood (ML) receiver to get a fairly good estimate of the transmitted signal. But both turbo-decoders and ML receivers are highly complex and also cause high delay in the iteration process.

The present disclosure presents an iterative approach to improve the estimation precision of the covariance matrix of interference plus noise for each iteration stepstage which means that the receiver performance can be substantially improved. Most known prior art iterative receivers (in each iteration loop) either try to improve the channel estimates using the soft symbols obtained in the last iteration, or try to improve the soft symbols information and then cancel some MIMO streams (layers) while decoding other streams. In the present disclosure iteratively improving the estimation of the covariance matrix of interference plus noise is instead presented. The estimated covariance matrix can be used in MMSE receivers, for example the MMSE-IRC receive or in any other kind of suitable receivers such as ML or quasi-ML receivers. Further, the iterative covariance matrix estimation method according to the present disclosure can co-exist seamlessly with other iterative receivers such that iteratively improving their channel estimates or soft symbols for interference cancellation.

For a fuller understanding of the present disclosure a channel model is presented based on the LTE system but it should be realized that the invention is not limited to the LTE system and can be used in any other suitable wireless communication system.

In LTE downlink, the $N_R$ dimensional received signal vector y at the k-th subcarrier and l-th symbol is, $$y(k,l) = H_0(k,l)s_0(k,l) + \sum_{i=1}^{N_{int}} H_i(k,l)s_i(k,l) + n(k,l),$$

where $N_R$ is the number of receive antennas of the receiver (UE); $s_0(k,l)$ is the signal from a serving cell, whose dimension r may or may not be equal to $N_T$ (the number of transmit antennas at the serving eNB). For example, in a 2×2 MIMO system, $N_T=N_R=2$, however r=1 under rank1 CLSM (closed Loop Spatial Multiplexing) and r=2 under rank2 CLSM (closed Loop Spatial Multiplexing); is is the number of interfering cells; $s_i(k,l)$ is the signal from the i-th interfering cell, and $1 \le i \le N_{int}$, where the rank of $s_i(k,l)$ is usually unknown; n(k,l) is the receiver noise; y(k,l) is the received signal; $H_0(k,l)$ is the effective channel between the serving cell and the UE; $H_i(k,l)$ is the effective channel between the i-th interfering cell and the UE.

It should be noted that in the effective channel model $H_0(k,l)$ and $H_i(k,l)$ above, the effective channel contains the effect of precoding matrices, which means for example in the closed loop transmission mode, that the effective channel is essentially the channel matrix of size $N_R \times N_T$ multiplied with precoding matrix of size $N_T \times r$, where r is the rank of the transmitted signal.

For simplicity without limiting the present disclosure, the effective channel representation is used without the effects of the precoding matrices in the rest of this application. However, it is important to keep in mind that due to UE scheduling and resource allocation, the precoding matrix may change between neighboring RBs, and this cause that the effective channel change abruptly at the PRB boundaries. Namely, the precoding matrix may change within each subframe between two neighboring RBs along the frequency direction, and it may change between two subframes along the time direction. As a direct consequence, the effective channel may change abruptly at these boundaries even if the channel variation over these boundaries is very small. Such effects are mitigated by different embodiments of the present disclosure.

In the above equation, the interference plus noise is $\sum_{i=1}^{N_{int}} H_i(k,l)s_i(k,l) + n(k,l)$. If the covariance of interference plus noise is denoted by R, then, $$R(k,l) = E\left[\left(\sum_{i=1}^{N_{int}} H_i(k,l)s_i(k,l) + n(k,l)\right)\left(\sum_{i=1}^{N_{int}} H_i(k,l)s_i(k,l) + n(k,l)\right)^H\right]$$

$$= \sum_{i=1}^{N_{int}} H_i(k,l)H_i^H(k,l) + \sigma_n^2 I,$$

where the upper script H means matrix Hermitian operator, and $\sigma_n^2$ is the receiver noise power. It is assumed in the above equation that the interfering signals $s_i(k,l)$ have unit transmission power, and the different streams of $s_i(k,l)$ are uncorrelated. Moreover, it is also assumed that the signals from different interfering cells are uncorrelated. Further, because the information of rank and precoding matrices of the interfering signals is unknown, in practice the covariance matrices cannot be computed using the equation above. So, even if through certain methods the channel matrices of size $N_R \times N_T$ between interference cells and the UE receiver can be measured, since those precoding matrices of size $N_T \times r$ is not known the effective channel matrix $H_i(k,l)$ is not known and therefore R(k,l) cannot be computed directly. In other words, R(k,l) need to be estimated based on the observations y(k,l) of the reference and data symbols of the received communication signal.

The present disclosure relates to a method for iteratively estimating the covariance matrix and a method for the use therefore, e.g. in a detector and/or decoder of a communication receiver device, such as a UE. It is assumed that communication signals in the wireless communication system include reference symbols and data symbols. The method comprises the step of receiving at least one communication signal transmitted over a radio channel. The received communication signal further comprises at least one designated communication signal intended for a receiver node (e.g. from a serving cell to a user node in the downlink, and from a user node to a serving cell in the uplink) and one or more interfering communication signals from interfering transmitters (e.g. interfering base stations in the downlink scenario, and interfering user nodes in the uplink scenario). The method further comprises the steps of:

a) computing a reference symbol covariance matrix estimate $\widetilde{R_{RS}}(k,l)$ based on reference symbols of the received communication signal;

b) inputting said reference symbol covariance matrix estimate $\widetilde{R_{RS}}(k,l)$ to a detector or a decoder so as to obtain a demodulated or decoded communication signal in the first iteration step, and thereafter, in the following iteration loops, inputting the covariance matrix estimate output from step e) to the detector or the decoder to obtain an updated demodulated or decoded communication signal for each iteration loop;

c) inputting the demodulated or decoded communication signal to a symbol generator so as to obtain a regenerated communication signal;

d) computing an updated data covariance matrix estimate $\widetilde{R_{data}}(k,l)$ for each iteration based on data symbols of said regenerated communication signal;

e) combining said reference symbol covariance matrix estimate $\widetilde{R_{RS}}(k,l)$ and said updated data covariance matrix estimate $\widetilde{R_{data}}(k,l)$ so as to obtain a covariance matrix estimate output based on said combined covariance matrix estimate; and f) forwarding said covariance matrix estimate output to the detector or decoder in b) so as to obtain the updated demodulated or decoded communication signal for each iteration loop.

Figure 2:
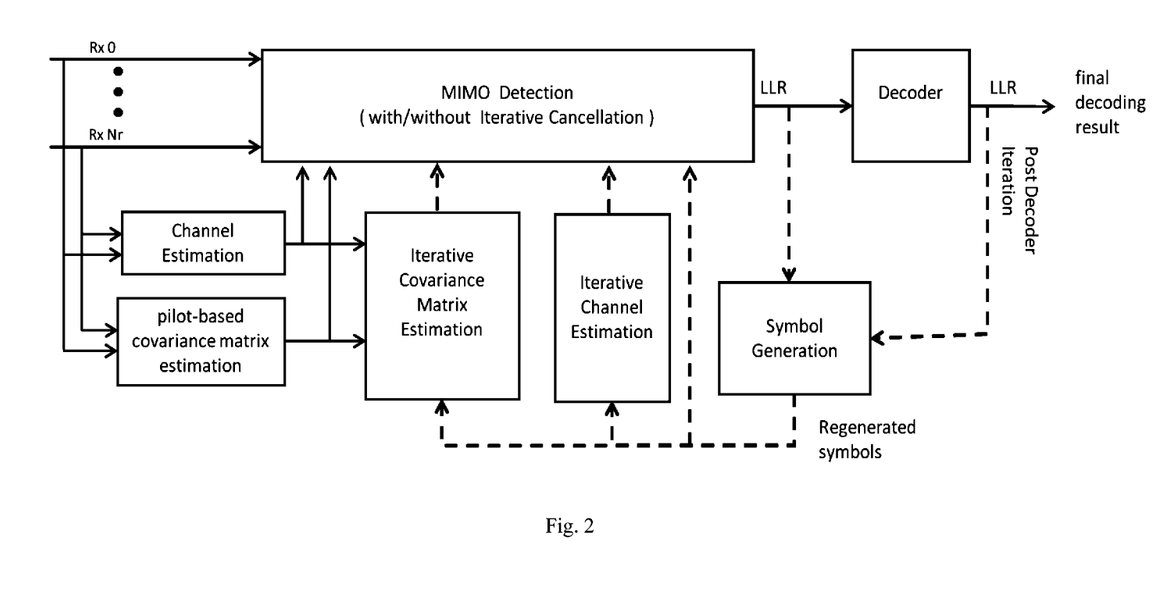
FIG. 2 illustrates an embodiment of the present disclosure.

FIG. 2 illustrates an embodiment of the present disclosure. A communication signal is received and firstly a reference symbol covariance matrix estimate $\widetilde{R_{RS}}(k,l)$ based on reference symbols of the received communication signal is computed. Thereafter, the received communication signal is inputted to a MIMO detector or a decoder (the direct coupling to decoder is not illustrated in FIG. 2). The present device also comprises a symbol generator block which in this embodiment takes log likelihood ratios (LLRs) information (detected or decoded communication signal) either from the decoder or MIMO detector outputs for processing. The symbol generator block regenerates the designated transmitted symbols $s_0(k,l)$ designated for the receiver sent from a transmitter node (e.g. the serving cell in the LTE downlink scenario, or the user node in the LTE uplink scenario), and the regenerated symbols is fed to the covariance matrix estimation block to be used to estimate the covariance matrices of interference plus noise on the data symbols of the communication symbols. i.e. $\widetilde{R_{data}}(k,l)$. Thereafter, a covariance matrix estimate output is obtained by combining $\widetilde{R_{RS}}(k,l)$ and $\widetilde{R_{data}}(k,l)$ which is performed in the iterative covariance matrix estimation box.

The covariance matrix estimate output is forwarded to the detector or the decoder (the direct coupling to decoder is not illustrated in FIG. 2) for the next iteration loop. The device in this embodiment also comprises an iterative channel estimator which uses the regenerated symbol to estimate the radio channel. This radio channel estimation is inputted to the detector which uses the radio channel estimation in the detection process. After a number of iteration loops: MIMO detector or decoder—symbol generator—covariance matrix estimation; a final decoding result is outputted by the decoder.

It is noted that it is a tradeoff between performance and complexity/delay regarding which output, from the detector or the decoder, that should be used by the symbol regenerator since the LLR quality from the decoder is better than from the MIMO detector. However, by including the decoder output in the covariance estimation iteration loop will cause longer delay in the processing. Moreover, the MIMO detector does not have to be ML or quasi-ML receivers (high complexity and good performance) but can be simpler linear receivers, e.g. linear MMSE receivers. The decoder according to the invention can be any suitable error correction code (ECC) decoders, such as turbo decoders, convolutional decoders, or LDPC decoders, depending on the ECC used by the corresponding encoder at the transmitter side.

It is further noted that the decoder itself often is iterative in nature. If the decoder is included in each covariance estimation iteration loop and its output is used to improve the covariance matrix estimation, different number of internal decoder iteration loops can be set for the turbo decoder module. For example, in the $1^{st}$, $2^{nd}$ and $3^{rd}$ (outer) iteration loops, the turbo decoder runs 4, 4, and 8 internal iteration loops, respectively. Similar to the turbo decoder's internal iteration loops, the MIMO detector can also have internal detector iteration loops involving the MIMO detector and the symbol regenerator, such that in each outer iteration loop, the MIMO detector and the symbol regenerator can iterate internally for a number of loops. These internal iteration loops can each also be configured similar to the case for the turbo decoder. It is therefore realized that the preset invention provides a very flexible solution for the designer since, for each covariance estimation outer iteration loop, the detector or the decoder can perform a number of internal loops.

Moreover, during the first iteration step, the covariance matrix estimates is only based on reference symbols, such as CRS or DM-RS according to an embodiment, since no regenerated symbols are yet available. Iterative covariance matrix estimation function can coexist with the iterative channel estimation function and the function of iterative cancellation of multi-stream signal.

Filtering

Between neighboring radio resource units (e.g. REs) the covariance matrix estimates can be improved by filtering/smoothing the covariance matrix estimates $\widetilde{R_{data}}(k,l)$ and $\widetilde{R_{RS}}(k,l)$ obtained in the aforementioned method steps if there is no abrupt change in the covariance matrices at the RE boundaries caused by precoding matrix change between neighboring REs according to an embodiment of the invention. That is, the frequency index k may span over several neighboring RBs, and the time index l may also span over several neighboring RBs (several neighboring subframes). Such a set of RBs are denoted as a filtering window. Two alternative approaches are suggested for filtering/smoothing the covariance matrices.

The first approach is to average the covariance matrices $\widetilde{R_{data}}(k,l)$ and $\widetilde{R_{RS}}(k,l)$ over the filtering window, but different weights may be assigned to the $\widetilde{R_{data}}(k,l)$ and $\widetilde{R_{RS}}(k,l)$ The combining can according to an embodiment have the form: $\widetilde{R_{RS}}(k,l)+\widetilde{R_{data}}(k,l)$, where a and b are scalars weights which easily can be obtained through simulations. The complexity of this approach is very low.

A slightly alternative approach to the above described is to first performing combining and averaging within each RB and thereafter a further step of weighted averaging over several neighboring RBs is performed. The complexity of this approach is higher but still very low.

The second approach can be performed by applying the MMSE based method for filtering the covariance matrices, and one filtered covariance matrix estimate $\hat{R}(k,l)$ for each RE can be obtained. Firstly, estimate the correlation coefficients between the covariance matrix elements for different REs, then based on the MMSE criteria filter the covariance matrix estimates for these REs within each filtering window. Again, such type of filtering should be carried out within a certain neighboring REs in the frequency and time dimensions (the constraint in the time direction is usually one PRB or several PRBs in e.g. LTE). Good filtering performance can be achieved with the suggested method. This method can e.g. be very useful if the UE speed is quite high and/or if the channel has a rather wide delay spread because in such scenarios the covariance matrices will change much faster, which means that filtering can perform better than only averaging.

As described, in order to get better performance in the above described filtering/smoothing process of the covariance matrices, it is desirable to have a proper filtering/smoothing size over the frequency and time dimensions.

In LTE the filtering window size of filtering/smoothing is usually one PRB in the time dimension. Because in a practical LTE downlink system, two consecutive subframes are very likely scheduled to different UEs, then to the same PRB position in the frequency dimension, the assigned precoding matrices are most likely not the same. In the frequency dimension within one subframe, the constraint range of filtering/smoothing can be more than one PRB, as such type of averaging may improve the performance under certain scenarios. However, if there are abrupt changes in the precoding matrix at the boundaries of the PRBs, then such kind of filtering/smoothing can even cause worse performance. It is thus important to handle this scenario.

According to an embodiment of the invention a two-step method/process is proposed to handle the performance problem caused by precoding matrix changing at RB boundaries when filtering/smoothing.

In the first step, the filtering/smoothing according to the approaches described above is performed, but in the frequency dimension constraint range of the filtering/smoothing can cover one or more RBs according to different filtering patterns. Some exemplary filtering patterns are shown in the FIG. 3 when filtering/smoothing the covariance matrix for the p-th PRB. In each example the PRBs marked are assumed to have the same precoding matrix and are used in the filtering/smoothing for the p-th PRB. If higher complexity is allowed, it is possible to have even more filtering patterns which may include more than 3 neighboring PRBs in the filtering/smoothing. It is also possible to have less number of filtering patterns, e.g. including only filtering pattern 1 or 4, in order to reduce the complexity.

Figure 3:
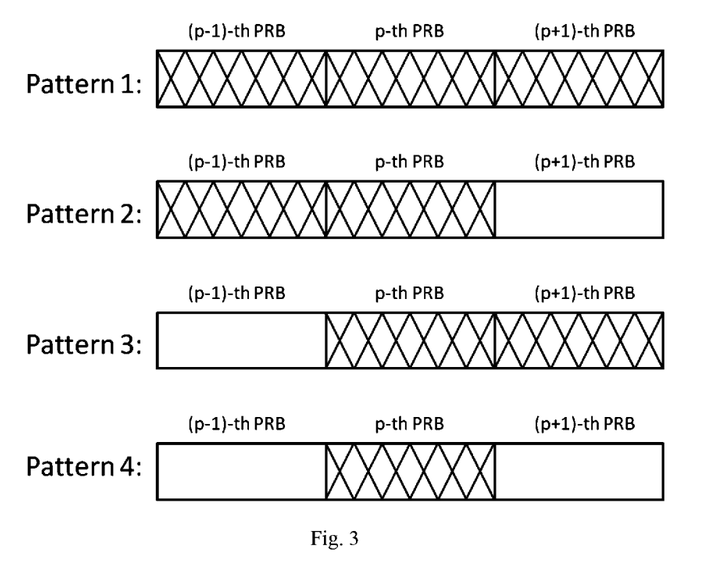
FIG. 3 illustrates different Physical Resource Block (PRB) patterns for filtering the covariance matrix.

In the first step, a set of filtered covariance matrix estimates $\hat{R}^{n_i}(k,l)$ will be obtained, each corresponding to the $n_i$-th filtering/smoothing pattern as shown in FIG. 3. For example, in FIG. 3, there are 4 filtering/smoothing patterns, each pattern assuming different precoding matrices for neighboring PRBs. With reference to FIG. 3:

In the $1^{st}$ pattern, it is assumed the 3 neighboring PRBs can be filtered together because there is no abrupt changes in the effective channel caused by precoding matrix changing at the boundaries between these 3 PRBs;

In the $2^{nd}$ pattern, it is assumed that (p−1)-th and p-th PRBs can be filtered together, while (p+1)-th PRB cannot because there is a precoding matrix change between the p-th and (p+1)-th PRBs;

In the $3^{rd}$ pattern, it is assumed that the (p+1)-th and p-th PRBs can be filtered together, while (p−1)-th PRB cannot because there is a precoding matrix change between p-th and (p−1)-th PRBs;

In the $4^{th}$ pattern, it is assumed that there are precoding matrix changes between these 3 PRBs. Thus we should not filter/smooth the covariance matrix over the boundaries between these PRBs.

As mentioned, it is noted that the above patterns are only for illustration and in practice other patterns can be used.

In the second step, the data REs of the p-th PRB are used to compute likelihood functions corresponding to each of the possible $\hat{R}^{n_i}(k,l)$. For robustness reasons, the data REs in the p-th PRB colliding with the CRS of the neighboring cells may be skipped. By assuming that the interfering signals plus noise is Gaussian of N (0, $\hat{R}^{n_i}(k,l)$) on the k-th subcarrier and l-th symbol, given that the set of data REs within the p-th PRB that would be used for computing the likelihood function, then the received data signal y(k,l) can be regarded as having distribution N(0, $\widetilde{H}_0(k,l)(\widetilde{H}_0(k,l))^H+\hat{R}^{n_i}(k,l)$). The likelihood function is therefore, $$P(R^{n_i}|y) = \prod_{[k,l]} \frac{1}{\sqrt{2\pi * \det(\overline{R}^{n_i}(k,l))}} \exp\left(-\frac{1}{2}y^H(k,l)(\overline{R}^{n_i}(k,l))^{-1}y(k,l)\right)$$

where {k,l} denote the set of data REs within the p-th PRB that are used for computing the likelihood function, and the matrix $\underline{R}^{n_i}(k,l)$ is, $\underline{R}^{n_i}(k,l) = \widetilde{H}_0(k,l)(\widetilde{H}_0(k,l))^H + \hat{R}^{n_i}(k,l)$.

After the likelihood functions corresponding to the set of filtering/smoothing patterns have been computed well-known statistical decision theory can be applied to decide which $\hat{R}^{n_i}(k,l)$ should be selectedchosen and sent to the MIMO detector or the turbo decoder in the next iteration loop. Maximum a posteriori (MAP) decision rule could be a good choice, but the a priori probabilities of each pattern hypotheses are needed, which statistically depend on the PMI granularity, channel conditions, and the relative position of the p-th PRB within the bandwidth, etc. A simplified alternative is to assume that all these filtering pattern hypotheses have the same a priori probabilities, and then the MAP decision rule is simplified and becomes the maximum likelihood (ML) rule. Namely, under this simplification, the Hypothesis $n_i$ is chosen if, $P(\hat{R}^{n_i}|y) > P(\hat{R}^{n_j}|y)$, for all $n_j \neq n_i$.

After the hypothesis testing, the set of covariance matrices $\hat{R}^{n_i}(k,l)$ that corresponds to the decision result Hypothesis rt, is sent to the MIMO detector or the turbo decoder for the next iteration loop.

Simulation Results

Figure 4:
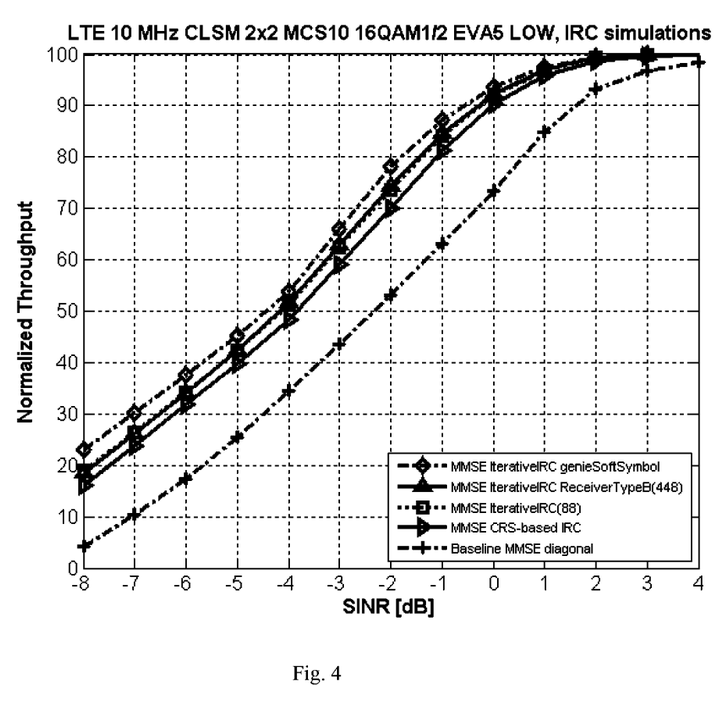
FIG. 4 shows simulation performance of the present disclosure.

The main intention of the simulation was to evaluate the performance difference when different covariance matrix estimation methods are used under cell edge scenarios. The simulation results are shown in FIG. 4 which shows the simulation results for the closed loop spatial multiplexing (CLSM) test case. The signal from the serving cell was CLSM rank1 and the interfering signals from two interfering cells were CLSM randomly 80% Rank1 and 20% Rank2. The geometry was SINR range [−8, 4] dB which is a typical cell edge scenario for macro cells. In the test setup, the DIPs were constant which means that compared to the power of the received signal, both the interference power and the noise power, will become smaller when the SINR increases. For example, at SINR=−1.73 dB, the power of the first interfering cell signal is the same as the power of the serving cell signal; while at SINR=4 dB, the power of the first interfering cell signal is 5.73 dB lower than the serving cell signal. Two types of iterative MMSE-IRC simulations were carried out. One simulation had 3 receiver iterations and the turbo decoder internal iterations were [4, 4, 8] in the 3 iteration loops. Another simulation had 2 iteration loops and the turbo decoder internal iterations were [8, 8] in the 2 iteration loops. This is mainly for the consideration of the hardware complexity. For comparison, the linear MMSE baseline receiver where interference plus noise is regarded as uncorrelated noise and thus the covariance matrix is diagonal (denoted as "Baseline MMSE diagonal" in FIG. 4) was also simulated; the MMSE-IRC using CRS-based covariance matrix estimates (denoted as "MMSE CRS-base IRC" in FIG. 4) was also simulated; and the MMSE-IRC receiver with iterative covariance matrix estimation assuming that the data symbols are known and can be used for covariance matrix estimation (which is unrealistic, but is suitable for performance benchmarking, and is denoted as "MMSE IterativeIRC genieSoftSymbol" in FIG. 4) was also simulated.

From the simulation results it was noted that: Compared to the CRS-based MMSE-IRC, the iterative MMSE-IRC method can improve around 0.5 dB to 0.7 dB when there are relative strong interference, e.g. when the SINR is in the range of [−2.5, 0] dB, which corresponds to 70%~90% TPUT range; When the SINR increases, the interference power becomes much smaller than the serving cell signal, the performance gap between the iterative MMSE-IRC and the CRS-base MMSE-IRC becomes smaller, which is expected.

Figure 5:
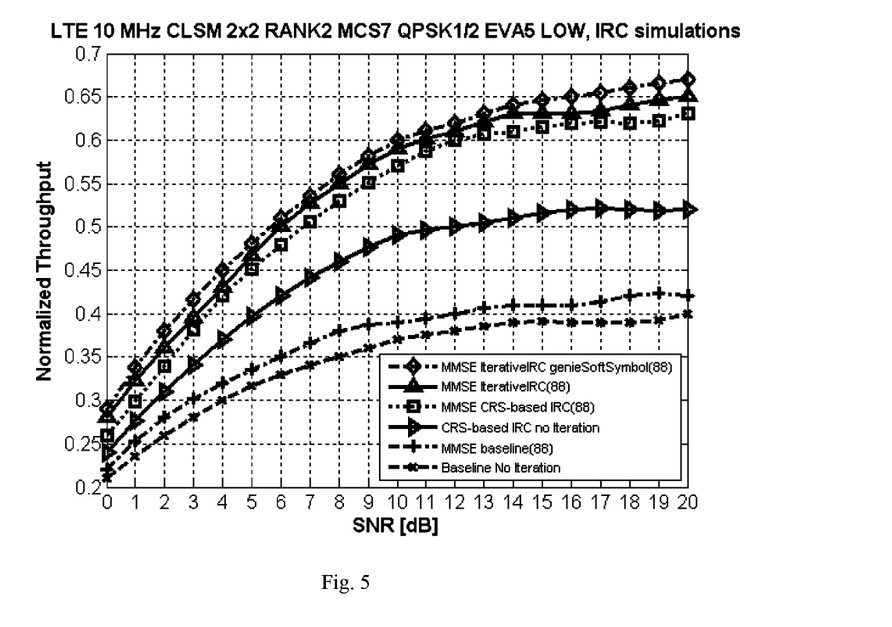
FIG. 5 shows simulation performance of the present disclosure.

FIG. 5 shows the simulation results for CLSM rank2 test case. The signal from the serving cell was CLSM rank2, and the interfering signals from two interfering cells was CLSM randomly 80% Rank1 and 20% Rank2. The geometry was SINR range [0, 20] dB. In the test setup, compared to the power of the received signal the interference power remained constant while the SNR changed. This is a kind of interference limited scenario. From the simulation results it was noted that compared to the CRS-based IRC, the iterative IRC method can improve around 1 dB in such type of interference limited scenario. For comparison, the linear MMSE baseline receiver where interference plus noise is regarded as uncorrelated noise and thus the covariance matrix is diagonal was also simulated. The non-iterative linear MMSE baseline receiver is denoted as "Baseline No Iteration" in FIG. 5, and the iterative linear MMSE baseline SIC receiver is denoted as "MMSE baseline (88)" in FIG. 5; the MMSE-IRC using CRS-based covariance matrix estimates (denoted as "CRS-based IRC no iteration" in FIG. 5, and denoted as "MMSE CRS-base IRC(88)" in FIG. 5) was also simulated; the MMSE-IRC receiver with iterative covariance matrix estimation assuming that the data symbols are known and can be used for covariance matrix estimation (which is unrealistic, but is suitable for performance benchmarking, and is denoted as "MMSE IterativeIRC genieSoftSymbol (88)" in FIG. 5)

was also simulated. It should be noted that compared to the rank1 test setup in FIG. 4, rank 2 signals were applied and therefore SIC (Successive Interference Cancellation) receiver was applied except the "Baseline No Iteration" test in FIG. 5.

Moreover, as understood by the person skilled in the art, any method according to the present disclosure may also be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Furthermore, the present method can be implemented and executed in suitable devices. It is realized by the skilled person that the present devices may comprise the necessary communication capabilities in the form of e.g. functions, means, units, elements, etc. for executing the methods according to the invention which means that the devices can be modified, mutatis mutandis, according to any method of the present disclosure. Examples of other such means, units, elements and functions are: memory, encoders, decoders, mapping units, multipliers, interleavers, deinterleavers, modulators, demodulators, inputs, outputs, antennas, amplifiers, DSPs, etc. which are suitably arranged together.

Especially, the processors of the present devices may comprise, e.g. one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g. any, some or all of the ones mentioned above. The processing circuitry may further perform data processing functions for inputting, outputting, and processing of data comprising data buffering and device control functions, such as call processing control, user interface control, or the like.

Figure 6:
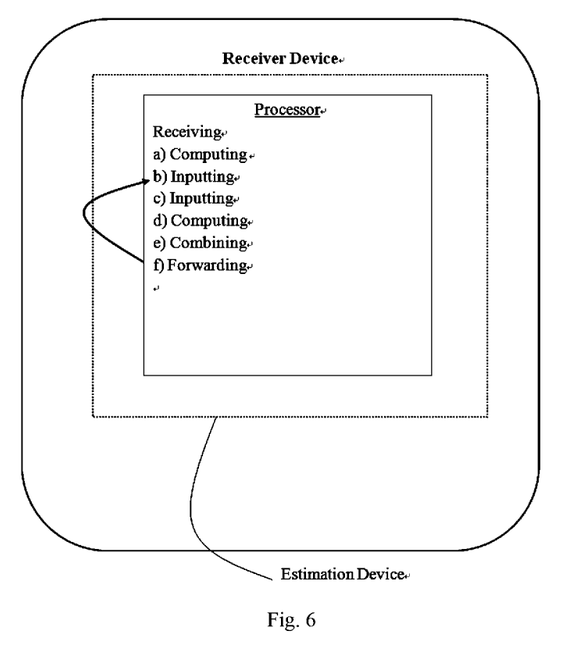
FIG. 6 illustrates an embodiment of a device according to the invention.

The present covariance matrix estimation device comprise a processor which is arranged to: receive at least one communication signal transmitted over a radio channel; a) compute a reference symbol covariance matrix estimate $\widetilde{R_{RS}}(k,l)$ based on reference symbols of the received communication signal; b) input said reference symbol covariance matrix estimate $\widetilde{R_{RS}}(k,l)$ to a detector or a decoder so as to obtain a demodulated or decoded communication signal in the first iteration step, else inputting the covariance matrix estimate output from e) as input to the detector or the decoder; c) input the demodulated or decoded communication signal to a symbol generator so as to obtain a regenerated communication signal; d) compute an updated data covariance matrix estimate $\widetilde{R_{data}}(k,l)$ for each iteration based on data symbols of said regenerated communication signal; e) combine said reference symbol covariance matrix estimate $\widetilde{R_{RS}}(k,l)$ and said updated data covariance matrix estimate $\widetilde{R_{data}}(k,l)$ so as to obtain a covariance matrix estimate output based on said combined covariance matrix estimate; and f) forward said covariance matrix estimate output to the detector or decoder in b) so as to obtain an updated demodulated or decoded communication signal for each iteration. This embodiment is illustrated in FIG. 6 in which the device comprises a processor arranged for executing the different steps of the present method. Further, according to this embodiment the estimation device is arranged in a receiver device having a detector and a decoder as illustrated in FIG. 6.

Figure 7:
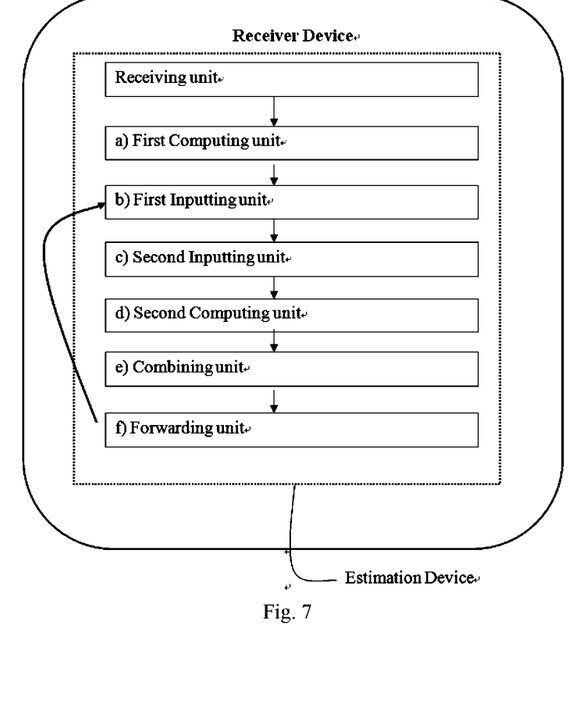
FIG. 7 illustrates an alternative device according to the invention.

Alternatively, according to another embodiment of the invention the present covariance matrix estimation device comprises a receiving unit, a first computing unit, a first inputting unit, a second inputting unit, a second computing unit, a combining unit, and a forwarding unit. This embodiment is illustrated in FIG. 7 in which the device comprises dedicated units for the corresponding method steps. Also, according to this embodiment the estimation device is arranged in a receiver device as illustrated in FIG. 7.

The present cellular system in which the present method may be used is e.g. a 3GPP system, such as LTE or LTE Advanced, or any other suitable cellular system, which is well understood by the skilled person. According to an embodiment of the invention, the wireless communication system is an OFDM communication system, such as 3GPP LTE and WiFi.

Finally, it should be understood that the present disclosure is not limited to the embodiments described above, but also relates to and incorporates all embodiments within the scope of the appended independent claims.

What is claimed is:

1. An iterative method for estimating covariance matrices of communication signals in a wireless communication system, wherein communication signals in the wireless communication system include reference symbols and data symbols; the method comprising:
   receiving a communication signal transmitted over a radio channel, the received communication signal comprising at least one designated communication signal intended for a receiver node and one or more interfering communication signals; the method comprising:
   a) computing a reference symbol covariance matrix estimate $\widetilde{R_{RS}}(k,l)$ based on reference symbols in the received communication signal wherein k is an integer and wherein l is an integer;
   b) inputting said reference symbol covariance matrix estimate $\widetilde{R_{RS}}(k,l)$ to a detector or a decoder to obtain a demodulated or decoded communication signal in a first iteration step, and thereafter inputting a covariance matrix estimate output to the detector or the decoder in subsequent iteration steps to obtain an updated demodulated or decoded communication signal for each iteration;
   c) inputting the demodulated or decoded communication signal to a symbol generator to obtain a regenerated communication signal;
   d) computing an updated data covariance matrix estimate $\widetilde{R_{data}}(k,l)$ for each iteration based on data symbols of said regenerated communication signal;
   e) combining said reference symbol covariance matrix estimate $\widetilde{R_{RS}}(k,l)$ mad said updated data covariance matrix estimate $\widetilde{R_{data}}(k,l)$ to obtain the covariance matrix estimate output; and
   f) forwarding said covariance matrix estimate output to the detector or decoder in b) to obtain the updated demodulated or decoded communication signal for each iteration,
   the method further comprising: filtering said reference symbol covariance matrix estimate $\widetilde{R_{RS}}(k,l)$ and said updated data covariance matrix estimate $\widetilde{R_{data}}(k,l)$ over a filtering window, the filtering window defining a set of resource blocks (RBs), or resource elements (REs), wherein each RB includes a plurality of REs.

2. The method according to claim 1, wherein the filtering includes:
   averaging said reference symbol covariance matrix estimate $\widetilde{R_{RS}}(k,l)$ and said updated data covariance matrix estimate $\widetilde{R_{data}}(k,l)$ over the filtering window.

3. The method according to claim 2, wherein the filtering further includes:
   averaging said reference symbol covariance matrix estimate $\widetilde{R_{RS}}(k,l)$ and said updated data covariance matrix estimate $\widetilde{R_{data}}(k,l)$ over each RB of the set of RBs so that said reference symbol covariance matrix estimate $\widetilde{R_{RS}}(k,l)$ and said updated data covariance matrix estimate $\widetilde{R_{data}}(k,l)$ are constant within each RB of the set of RBs; and
   averaging said reference symbol covariance matrix estimate $\widetilde{R_{RS}}(k,l)$ and said updated data covariance matrix estimate $\widetilde{R_{data}}(k,l)$ over the filtering window using filter weights.

4. The method according to claim 1, wherein the filtering step includes:
   estimating correlation coefficients between covariance matrix elements for each RE of the filtering window, and filtering said reference symbol covariance matrix estimate $\widetilde{R_{RS}}(k,l)$ and said updated data covariance matrix estimate $\widetilde{R_{data}}(k,l)$ based on a Minimum Mean Square Error (MMSE) criterion using the estimated correlation coefficients over the filtering window.

5. The method according to claim 1, wherein precoding is employed on transmission data in the wireless communication system, and wherein the method further comprises:
   filtering different sets of RBs $n_i$, wherein each set of RBs defines the filtering window around and including a p-th RB so as to obtain a set of filtered covariance matrix estimates $\hat{R}^{n_i}(k,l)$ each corresponding to the sets of RBs $n_i$, wherein i is an integer and wherein p is an integer;
   computing likelihood functions for each covariance matrix estimate $\hat{R}^{n_i}(k,l)$; and
   selecting the covariance matrix estimate $\hat{R}^{n_i}(k,l)$ for the p-th RB, based on the likelihood functions, which is most probable as the covariance matrix estimate output for the p-th RB.

6. The method according to claim 5, wherein selecting said covariance matrix estimate output is based on the maximum posteriori (MAP) or the maximum likelihood (ML) decision rule applied on the likelihood functions.

7. The method according to claim 1, wherein the inputting the demodulated or decoded communication signal includes:
   regenerating an intended communication signal $s_0(k,l)$ of the received communication signal; and the computing said updated data covariance matrix estimate $\widetilde{R_{data}}(k,l)$ includes:
   estimating said updated data covariance matrix $\widetilde{R_{data}}(k,l)$ based on the regenerated communication signal $s_0(k,l)$.

8. An iterative method for estimating covariance matrices of communication signals in a wireless communication system wherein communication signals in the wireless communication system include reference symbols and data symbols; the method comprising:
   receiving a communication signal transmitted over a radio channel the received communication signal comprising at least one designated communication signal intended for a receiver node and one or more interfering communication signals; the method comprising:
a) computing a reference symbol covariance matrix estimate $\widetilde{R_{RS}}(k,l)$ based on reference symbols in the received communication signal wherein k is an integer and wherein l is an integer;
b) inputting said reference symbol covariance matrix estimate $\widetilde{R_{RS}}(k,l)$ to a detector or a decoder to obtain a demodulated or decoded communication signal in a first iteration step, and thereafter inputting a covariance matrix estimate output to the detector or the decoder in subsequent iteration steps to obtain an updated demodulated or decoded communication signal for each iteration;
c) inputting the demodulated or decoded communication signal to a symbol generator to obtain a regenerated communication signal;
d) computing an updated data covariance matrix estimate $\widetilde{R_{data}}(k,l)$ for each iteration based on data symbols of said regenerated communication signal;
e) combining said reference symbol covariance matrix estimate $\widetilde{R_{RS}}(k,l)$ and said updated data covariance matrix estimate $\widetilde{R_{data}}(k,l)$ to obtain the covariance matrix estimate output, wherein said reference symbol covariance matrix estimate $\widetilde{R_{RS}}(k,l)$ and said updated data covariance matrix estimate $\widetilde{R_{data}}(k,l)$ are linearly combined in the form: $a\widetilde{R_{RS}}(k,l)+b\widetilde{R_{data}}(k,l)$, where a and b are scalars; and
f) forwarding said covariance matrix estimate output to the detector or decoder in b) to obtain the updated demodulated or decoded communication signal for each iteration.

9. The method according to claim 1, wherein the demodulated communication signal from the detector or the decoded communication symbol from the decoder is represented as Log Likelihood Ratios, LLRs.

10. The method according to claim 1, wherein the decoder is an error correction code decoder.

11. The method according to claim 1, wherein the detector is a Multiple-Input and Multiple-Output (MIMO) detector.

12. The method according to claim 1, wherein the reference symbols are pilot symbols.

13. The method according to claim 1, wherein the wireless communication system is an Orthogonal Frequency-Division Multiplexing (OFDM) communication system.

14. The method according to claim 1, further comprising: using at least one covariance matrix estimation output for demodulation and/or decoding of the received communication signal.

15. A non-transitory computer readable medium having computer executable instructions, which when executed by a processor causes said processor to:
a) compute a reference symbol covariance matrix estimate $\widetilde{R_{RS}}(k,l)$ based on reference symbols of a received communication signal wherein k is an integer and wherein l is an integer;
b) input said reference symbol covariance matrix estimate $\widetilde{R_{RS}}(k,l)$ to a detector or a decoder to obtain a demodulated or decoded communication signal in a first iteration step, and thereafter inputting a covariance matrix estimate output to the detector or the decoder in subsequent iterations to obtain an updated demodulated or decoded communication signal for each iteration;
c) input the demodulated or decoded communication signal to a symbol generator to obtain a regenerated communication signal;
d) compute an updated data covariance matrix estimate $\widetilde{R_{data}}(k,l)$ for each iteration based on data symbols of said regenerated communication signal;
e) combine said reference symbol covariance matrix estimate $\widetilde{R_{RS}}(k,l)$ and said updated data covariance matrix estimate $\widetilde{R_{data}}(k,l)$ to obtain the covariance matrix estimate output; and
f) forward said covariance matrix estimate output to the detector or decoder in b) to obtain the updated demodulated or decoded communication signal for each iteration,
the instructions further causing said processor to filter said reference symbol covariance matrix estimate $\widetilde{R_{RS}}(k,l)$ and said updated data covariance matrix estimate $\widetilde{R_{data}}(k,l)$ over a filtering window, the filtering window defining a set of resource blocks (RBs), or resource elements (REs), wherein each RB includes a plurality of REs.

16. A device configured to iteratively estimate covariance matrices of communication signals in a wireless communication system, wherein communication signals in the wireless communication system include reference symbols and data symbols; the device comprises a processor configured to:
receive a communication signal transmitted over a radio channel, the received communication signal comprising at least one designated communication signal intended for a receiver node and one or more interfering communication signals; the processor further being configured to:
a) compute a reference symbol covariance matrix estimate $\widetilde{R_{RS}}(k,l)$ based on reference symbols of the received communication signal, wherein k is an integer and wherein l is an integer;
b) input said reference symbol covariance matrix estimate $\widetilde{R_{RS}}(k,l)$ to a detector or a decoder to obtain a demodulated or decoded communication signal in a first iteration step, and thereafter input a covariance matrix estimate output to the detector or the decoder in subsequent iterations to obtain an updated demodulated or decoded communication signal for each iteration;
c) input the demodulated or decoded communication signal to a symbol generator so as to obtain a regenerated communication signal;
d) compute an updated data covariance matrix estimate $\widetilde{R_{data}}(k,l)$ for each iteration based on data symbols of said regenerated communication signal;
e) combine said reference symbol covariance matrix estimate $\widetilde{R_{RS}}(k,l)$ and said updated data covariance matrix estimate $\widetilde{R_{data}}(k,l)$ to obtain the covariance matrix estimate output; and
f) forward said covariance matrix estimate output to the detector or decoder in b) to obtain the updated demodulated or decoded communication signal for each iteration,
the processor further being configured to filter said reference symbol covariance matrix estimate $\widetilde{R_{RS}}(k,l)$ and said updated data covariance matrix estimate $\widetilde{R_{data}}(k,l)$ over a filtering window, the filtering window defining a set of resource blocks (RBs) or resource elements (REs) wherein each RB includes a plurality of REs.

17. A receiver communication device configured to communicate arranged in a wireless communication system, the receiver device comprising at least one processor being configured to:
   a) compute a reference symbol covariance matrix estimate $\widetilde{R_{RS}}(k,l)$ based on reference symbols of a received communication signal wherein k is an integer and wherein l is an integer;
   b) input said reference symbol covariance matrix estimate $\widetilde{R_{RS}}(k,l)$ a detector or a decoder to obtain a demodulated or decoded communication signal in a first iteration step, and thereafter input a covariance matrix estimate output to the detector or the decoder in subsequent iterations to obtain an updated demodulated or decoded communication signal for each iteration;
   c) input the demodulated or decoded communication signal to a symbol generator so as to obtain a regenerated communication signal;
   d) compute an updated data covariance matrix estimate $\widetilde{R_{data}}(k,l)$ for each iteration based on data symbols of said regenerated communication signal;
   e) combine said reference symbol covariance matrix estimate $\widetilde{R_{RS}}(k,l)$ and said updated data covariance matrix estimate $\widetilde{R_{data}}(k,l)$ to obtain the covariance matrix estimate output; and
   f) forward said covariance matrix estimate output to the detector or decoder in b) to obtain the updated demodulated or decoded communication signal for each iteration;
   and the receiver device further being configured to use at least one covariance matrix estimation output estimated by the at least one processor,
   the at least one processor further being configured to filter said reference symbol covariance matrix estimate $\widetilde{R_{RS}}(k,l)$ and said updated data covariance matrix estimate $\widetilde{R_{data}}(k,l)$ over a filtering window, the filtering window defining a set of resource blocks (RBs), or resource elements (REs), wherein each RB includes a plurality of REs.

18. A device configured to iteratively estimate covariance matrices of communication signals in a wireless communication system, wherein communication signals in the wireless communication system include reference symbols and data symbols; the device comprises a processor configured to:
   receive a communication signal transmitted over a radio channel, the received communication signal comprising at least one designated communication signal intended for a receiver node and one or more interfering communication signals; the processor further being configured to:
   a) compute a reference symbol covariance matrix estimate $\widetilde{R_{RS}}(k,l)$ based on reference symbols of the received communication signal, wherein k is an integer and wherein l is an integer;
   b) input said reference symbol covariance matrix estimate $\widetilde{R_{RS}}(k,l)$ to a detector or a decoder to obtain a demodulated or decoded communication signal in a first iteration step, and thereafter input a covariance matrix estimate output to the detector or the decoder in subsequent iterations to obtain an updated demodulated or decoded communication signal for each iteration;
   c) input the demodulated or decoded communication signal to a symbol generator to obtain a regenerated communication signal;
   d) compute an updated data covariance matrix estimate $\widetilde{R_{data}}(k,l)$ for each iteration based on data symbols of said regenerated communication signal;
   e) combine said reference symbol covariance matrix estimate $\widetilde{R_{RS}}(k,l)$ and said updated data covariance matrix estimate $\widetilde{R_{data}}(k,l)$ to obtain the covariance matrix estimate output, wherein said reference symbol covariance matrix estimate $\widetilde{R_{RS}}(k,l)$ and said updated data covariance matrix estimate $\widetilde{R_{data}}(k,l)$ are linearly combined in the form: $a\widetilde{R_{RS}}(k,l)+b\widetilde{R_{data}}(k,l)$, where a and b are scalars; and
   f) forward said covariance matrix estimate output to the detector or decoder in b) to obtain the updated demodulated or decoded communication signal for each iteration.

19. A receiver communication device configured to communicate in a wireless communication system, the receiver device comprising at least one processor being configured to:
   a) compute a reference symbol covariance matrix estimate $\widetilde{R_{RS}}(k,l)$ based on reference symbols of a received communication signal, wherein k is an integer and wherein l is an integer;
   b) input said reference symbol covariance matrix estimate $\widetilde{R_{RS}}(k,l)$ to a detector or a decoder to obtain a demodulated or decoded communication signal in a first iteration step, and thereafter input a covariance matrix estimate output to the detector or the decoder in subsequent iterations to obtain an updated demodulated or decoded communication signal for each iteration;
   c) input the demodulated or decoded communication signal to a symbol generator to obtain a regenerated communication signal;
   d) compute an updated data covariance matrix estimate $\widetilde{R_{data}}(k,l)$ for each iteration based on data symbols of said regenerated communication signal;
   e) combine said reference symbol covariance matrix estimate $\widetilde{R_{RS}}(k,l)$ and said updated data covariance matrix estimate $\widetilde{R_{data}}(k,l)$ to obtain the covariance matrix estimate output, wherein said reference symbol covariance matrix estimate $\widetilde{R_{RS}}(k,l)$ and said updated data covariance matrix estimate $\widetilde{R_{data}}(k,l)$ are linearly combined in the form: $a\widetilde{R_{RS}}(k,l)+b\widetilde{R_{data}}(k,l)$, where a and b are scalars; and
   f) forward said covariance matrix estimate output to the detector or decoder in b) to obtain the updated demodulated or decoded communication signal for each iteration;
   and the receiver device further being configured to use at least one covariance matrix estimation output estimated by the at least one processor.

* * * * *

UNITED STATES PATENT AND TRADEMARK OFFICE
CERTIFICATE OF CORRECTION

PATENT NO. : 9,160,383 B2  
APPLICATION NO. : 14/077968  
DATED : October 13, 2015  
INVENTOR(S) : Chen et al.

Page 1 of 1

It is certified that error appears in the above-identified patent and that said Letters Patent is hereby corrected as shown below:

IN THE CLAIMS  
Column 13, line 56, "mad said" should read -- and said --.

Signed and Sealed this  
Twenty-third Day of February, 2016

Michelle K. Lee  
*Director of the United States Patent and Trademark Office*